US006699551B2

(12) United States Patent
Roth et al.

(10) Patent No.: US 6,699,551 B2
(45) Date of Patent: Mar. 2, 2004

(54) PRINTABLE FORM WITH REMOVABLE LABEL AND METHOD FOR PRODUCING SAME

(75) Inventors: Joseph D. Roth, Springboro, OH (US); Mitchell D. Bauer, Lititz, PA (US)

(73) Assignee: NCR Corporation, Dayton, OH (US)

( * ) Notice: Subject to any disclaimer, the term of this patent is extended or adjusted under 35 U.S.C. 154(b) by 175 days.

(21) Appl. No.: 09/681,177

(22) Filed: Feb. 9, 2001

(65) Prior Publication Data

US 2002/0108706 A1 Aug. 15, 2002

(51) Int. Cl.[7] .................................................. B32B 7/12

(52) U.S. Cl. ........................ 428/40.1; 283/81; 283/101; 283/105; 428/41.4; 428/42.1; 428/42.2; 428/42.3; 428/43; 428/192; 428/194

(58) Field of Search ............................... 428/40.1, 42.1, 428/42.2, 42.3, 192, 194, 41.4, 43; 283/81, 101, 105

(56) References Cited

U.S. PATENT DOCUMENTS 4,421,904 A * 12/1983 Eckberg et al. ............... 528/27
4,460,371 A 7/1984 Abber
4,503,208 A 3/1985 Lin et al.
4,504,629 A 3/1985 Lien et al.
4,507,187 A 3/1985 Jacobine et al.
4,563,539 A 1/1986 Gornowicz et al.
4,575,546 A 3/1986 Klemarczyk et al.
4,647,504 A 3/1987 Kimimura et al.
4,665,147 A 5/1987 Lien et al.
5,100,976 A 3/1992 Hamada et al.
5,179,134 A 1/1993 Chu et al.
5,240,153 A 8/1993 Tubaki et al.
5,384,340 A 1/1995 Hara et al.
5,405,888 A 4/1995 Takeoka
5,482,988 A 1/1996 Ulman et al.
5,489,622 A 2/1996 Hara et al.
5,489,624 A 2/1996 Kantner et al.
5,500,300 A 3/1996 Eckberg
5,507,901 A 4/1996 Limina et al.
5,512,612 A 4/1996 Brown et al.
5,583,185 A 12/1996 Parellada Ferrer et al.
5,614,640 A 3/1997 Okawa
5,632,842 A 5/1997 Oliver et al.
5,656,369 A 8/1997 Chess et al.
5,714,524 A 2/1998 Hara et al.
5,716,701 A 2/1998 Skoglund et al.
6,071,585 A * 6/2000 Roth ......................... 428/41.8
6,096,397 A * 8/2000 Murphy ..................... 428/40.1
6,413,603 B1 * 7/2002 Horton et al. ............. 428/40.1
6,432,499 B1 * 8/2002 Roth et al. ................. 428/40.1

* cited by examiner

*Primary Examiner*—Nasser Ahmad
(74) *Attorney, Agent, or Firm*—Millen, White, Zelano & Branigan, P.C.

(57) ABSTRACT

Printable forms such as business forms having removable labels integrated therein are produced by applying a silicone release layer to the front face thereof and applying a label-patch with a face-stock of a distinct composition over said release layer. The face-stock is die cut or perforated to define at least one removable label.

17 Claims, 4 Drawing Sheets

PRINTABLE FORM WITH REMOVABLE LABEL AND METHOD FOR PRODUCING SAME

BACKGROUND OF INVENTION

The present invention is directed to a printable form such as a business form having a base sheet and an integral removable label associated therewith made of a material distinct from the base sheet. The present invention is also directed to a method for making such a printable form.

In the manufacture of printable forms such as business forms there are circumstances in which it is desirable to form an integral, but ultimately separable, self-adhesive label as part of the printable form. There are also many circumstances in which it is desirable to print on the self-adhesive label and on the back of the printable form.

Conventional methods for the manufacture of printable forms with integrated removable labels typically require either the lamination of two webs of material or the direct adhesion of a label laminate to a base sheet. When laminating two webs of material to prepare an integrated form/label, one web is a base sheet of the form for printing and the other web provides a backing for the label. A pressure-sensitive adhesive is typically applied to a portion of the rear face of the base sheet (first web) followed with a backing comprised of paper or similar material (second web) coated with a release layer. This combination of backing and adhesive material is often referred to as a liner-patch. A label is then cut from the base sheet where the backing has been applied. A variation of this procedure is to simultaneously apply the pressure-sensitive adhesive and backing (paper coated with release layer) to the rear face of the base sheet in the form of a transfer tape so that the adhesive layer of this transfer tape contacts the rear face of the base sheet. Other examples of laminating techniques used to produce business forms with labels integrated therein are described in U.S. Pat. Nos. 5,240,153; 5,507,901; 5,632,842 and 5,656,369. While these laminating techniques provide adequate form/label combinations, there are limitations. Special labels with a face-stock made of synthetic materials cannot be provided unless the entire base sheet is formed of the synthetic material.

As mentioned above, an alternative to lamination techniques using a liner-patch or transfer tape is to adhere a complete label laminate, including face-stock, adhesive and a backing, to a base sheet. This technique will provide labels with a face-stock of synthetic materials without requiring that the entire base sheet be made of the synthetic material. However, the use of a complete label laminate requires that the form/label combination have a thickness greater than 3 webs at the label provided by a base sheet, a label backing and a label face-stock. This increase in thickness increases the risk of paper jams in printing equipment. There is also an increased risk of separation of the face-stock or backing from the base sheet during printing or handling resulting in exposure of adhesive.

SUMMARY OF INVENTION

The present invention provides printable forms with integrated removable labels having a face-stock of a material distinct from the material of the base sheet which requires only 2 webs at the label location. This is accomplished by using a component, referred to herein as a label-patch, on the front face of a base sheet. The label-patch comprises a face-stock and an adhesive. The use of the label-patch allows the face-stock of the label to be of material distinct from that of the base sheet without requiring 3 webs of material at the label. The printable forms of this invention and the methods for obtaining them do not require the use of a complete label laminate to provide a label face-stock of a material distinct from the base sheet. In using a label-patch, instead of a label laminate the present invention eliminates the need for a separate backing layer for the integrated label which eliminates the possibility for the base sheet to separate from the backing. The use of the label-patch also reduces the tendency of the integrated form to jam the printing equipment during use due to a reduced thickness at the label.

To eliminate the backing layer and permit the use of a label-patch, the base sheet of the printable form must support a solid silicone release layer. To accomplish this, a silicone coating composition is preferably deposited on the front face of the base sheet and cured, preferably with UV light.

The printable forms of the present invention are well suited for duplex printing applications where variable print is printed on both the front and back of the printable form. The papers used for the backing of liner-patches are normally super calendered Kraft papers that are not toner receptive in that they are too smooth for the toner to anchor properly. By eliminating the liner-patch, the entire rear face of the base sheet is available for printing. In contrast, the face-stock of the label-patch is receptive to toner. Printing along the edge of the label-patch and the base sheet should be avoided due to the height difference. This is not a disadvantage in that print along the edges of the label is typically avoided for proper formatting. The increase in thickness of the printable form at the label with the use of a label-patch is less than that when using a label laminate.

More than one different type of label face-stock material can be applied to a single base sheet such, as for example, both a label-patch with a polyethylene terephthalate face-stock label and a label-patch with a face-stock of bond paper can be applied to a base sheet. The printable forms of this invention include individually cut sheets or continuous sheets. In other embodiments, print under the silicone release layer can be provided by printing of the base sheet before the silicone release layer is applied. In preferred embodiments, the edges of the face-stock for the label-patch are locked down by extending beyond the silicone release layer and adhering directly to the surface of the base sheet.

DETAILED DESCRIPTION

Figure 1:
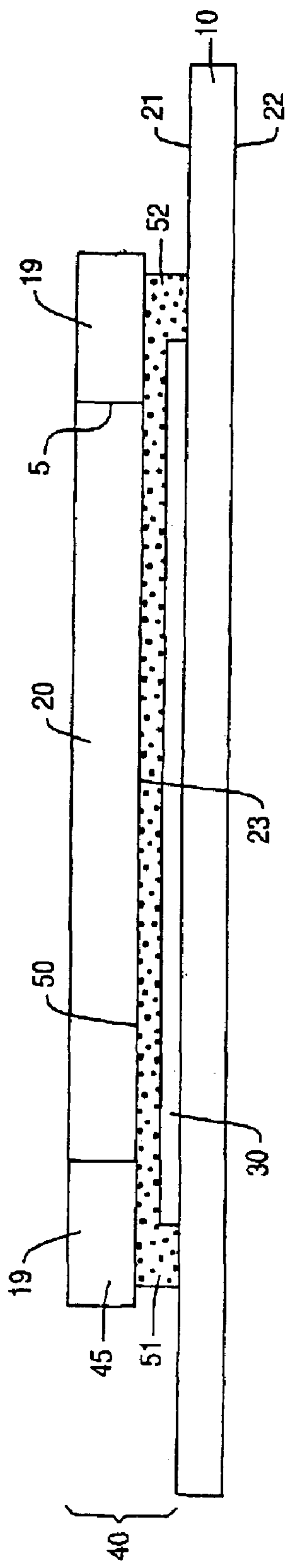
FIG. 1 is a cross-sectional view of a portion of a printable form of the present invention where the integral removable label is located the edges are locked down, which is optional. The thickness of the components is greatly exaggerated for clarity of illustration.
Figure 3:
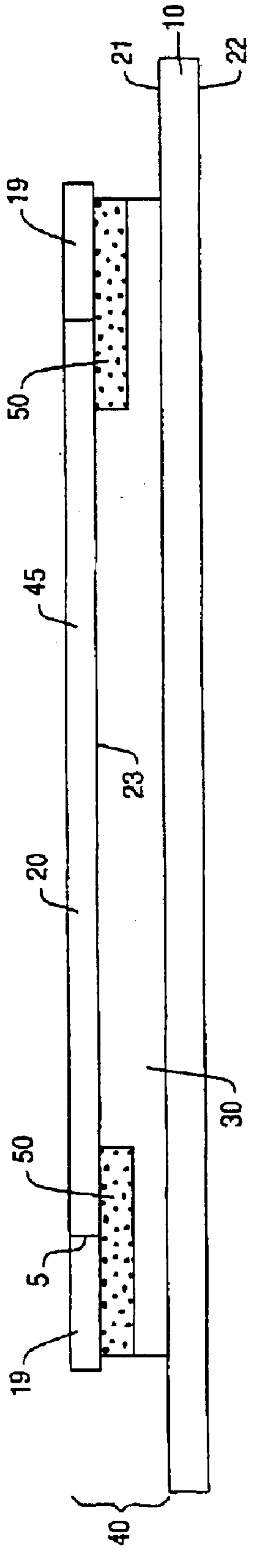
FIG. 3 is a cross-sectional view of a portion of another printable form of the present invention where the integral removable label is located.
Figure 4:
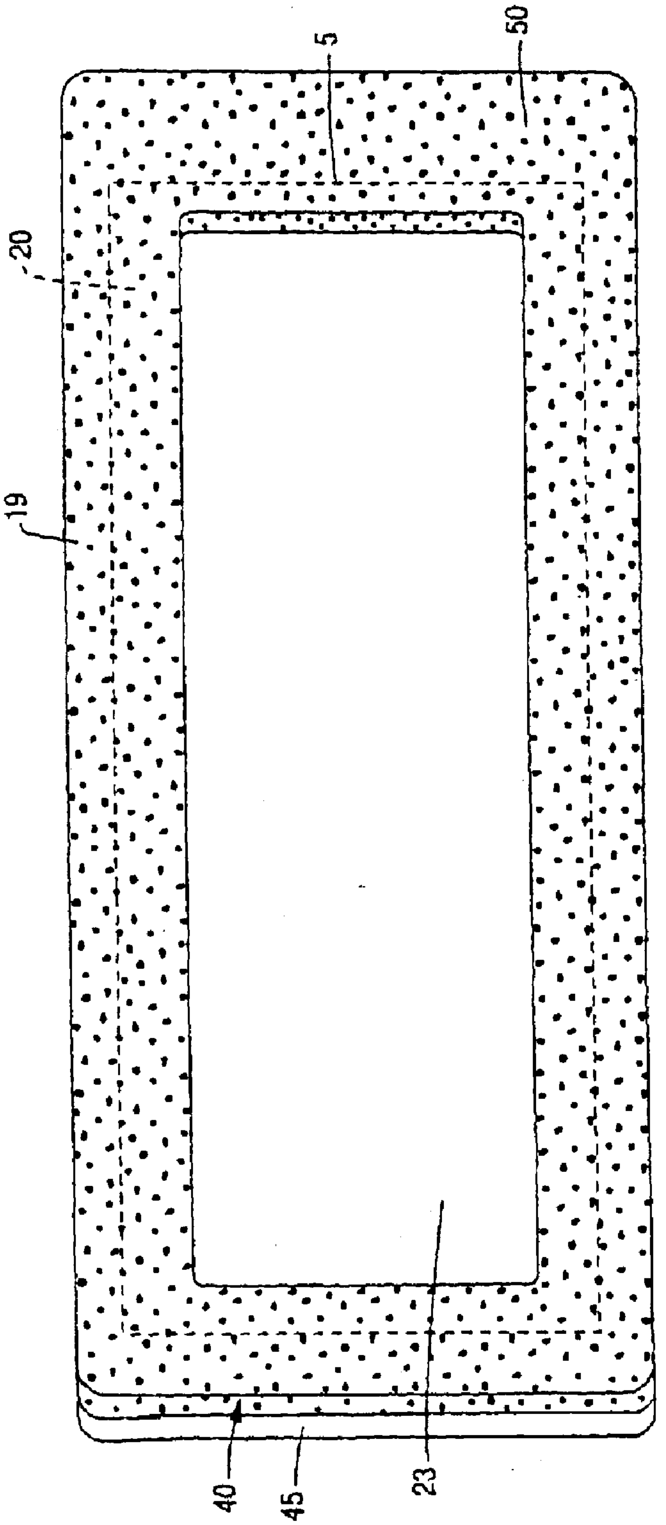
FIG. 4 is a perspective view of the rear face of a label-patch before it is applied to a base sheet to form a printable form as in FIG. 3.

In FIG. 1, base sheet 10 has an integral, removable label 20 positioned thereon which is defined by die cut 5. Base sheet 10 has a front face 21 and a rear face 22 each suitable for printing. Silicon release layer 30 is coated on a portion of front face 21 of base sheet 10 beneath label 20. Label-patch 40 is positioned over silicon layer 30 and comprises face-stock 45 and pressure-sensitive adhesive 50. Optional overlapping portions 51 and 52 of pressure-sensitive adhesive 50 bond face-stock 45 to front face 21 of base sheet 10, referred to herein as locking down the label face-stock 45. In FIG. 1, both the pressure-sensitive adhesive layer 50 and the solid silicone layer 30 extend beyond die cut 5 in face-stock 45, which is optional. The pressure-sensitive adhesive layer and/or solid silicone layer need not extend beyond die cut 5, which defines and separates label 20 from the border 19. Die cut 5 can alternatively be a perforation or micro-perforation which defines label 20, wherein label 20 remains attached to 45. The face-stock 45 can be perforated before or after application to base sheet 10. In FIG. 1, the pressure-sensitive adhesive 50 is a uniform layer. However, printable sheets of the present invention include those wherein only portions of rear face 23 of face-stock 45 are coated with pressure-sensitive adhesive. FIG. 3 shows an alternative embodiment, wherein only portions of the rear surface 23 of face-stock 45 are coated with adhesive layer 50. FIG. 4 shows the rear face of a label-patch before it is applied to a base sheet to form a printable form/label combination as in FIG. 3.

Figure 2:
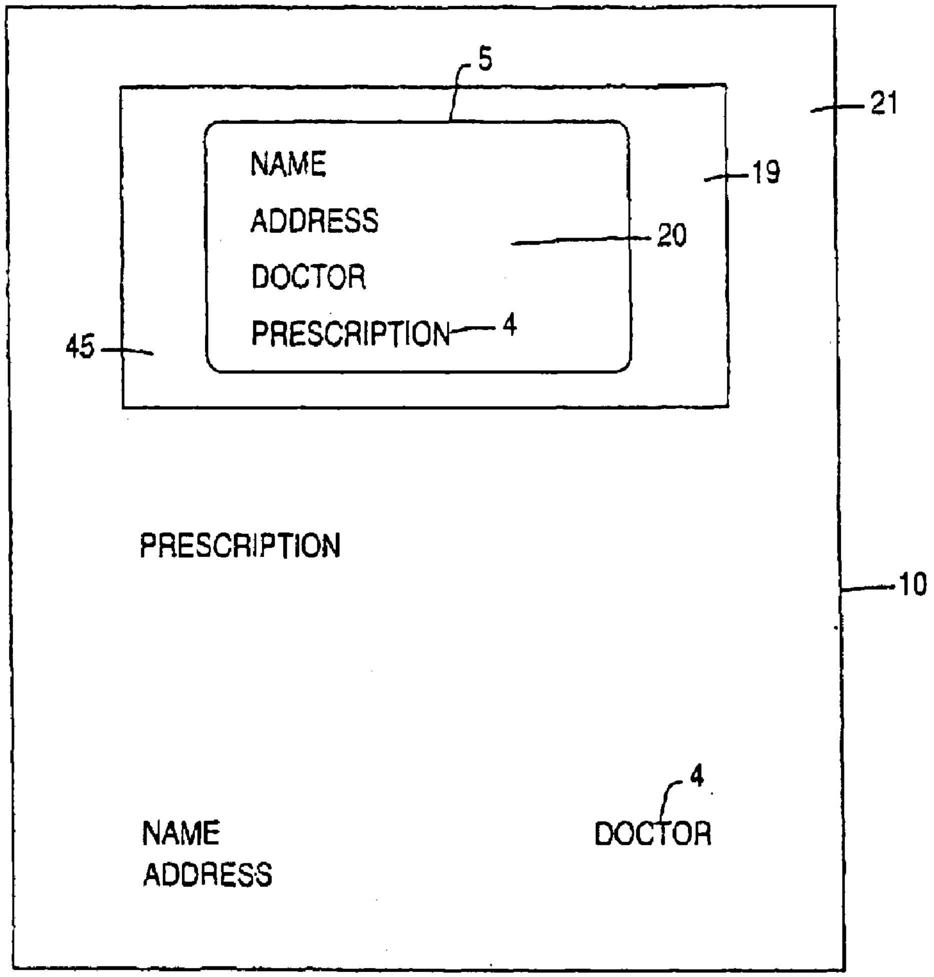
FIG. 2 is a front view of a printable form of the present invention with one integral removable label.

FIG. 2 illustrates a printable sheet of the present invention with front face 21 of base sheet 10 shown. The embodiment of FIG. 2 has only one integral label 20 defined by die cut 5 in face-stock 45. The embodiment is shown after printing with printed indicia 4 on front face 21 and on label 20.

Base sheet 10 is paper or other sheet material capable of receiving print thereon. Preferably, base sheet 10 is a commercially available paper conventionally used in business forms but can include speciality papers and other cellulosic material such as cardboard or synthetic polymer materials. This includes individual paper sheets as well as continuous paper rolls and continuous paper fanfolds or similar continuous folding arrangements for paper. The paper can also be part of a multi-page form. The paper can be coated or uncoated; however, the front face 21 of the paper must be capable of receiving print thereon, capable of having a solid silicone release layer bond thereto and capable of having a pressure-sensitive adhesive bond thereto. Rear face 22 is preferably suitable for printing, but such a feature is not required. To obtain these properties from conventional, commercially available papers typically does not require any special coating or preparation. The base sheet 10 is preferably sufficiently thick to provide sufficient strength to support the label-patch and allow printing to be performed on front face 21.

Label-patch 40 comprises a face-stock 45 and pressure-sensitive adhesive 50. The face-stock comprises a printable material which is distinct from the base sheet. Due to the small size of the face-stock relative to the base sheet, it can comprise more expensive materials such as synthetic resin layers. The label-patch can be prepared by coating the face-stock with pressure-sensitive adhesive by conventional techniques. The label-patch can be in the form of a roll similar to adhesive tape or sheets.

Pressure-sensitive adhesive 50 must have sufficient strength to bond the face-stock of a label-patch to a silicone coated base sheet. Pressure-sensitive adhesive 50 can be a conventional pressure-sensitive adhesive used for labels. These include adhesives based on silicone resins, ethyl vinyl acetate copolymers, polyurethanes, polychloroprenes, polybutadienes, butadiene acrylonitrile rubbers, natural rubbers, styrene butadiene rubbers, acrylics, polyisobutylenes, butyl rubbers, higher polyvinyl alkyl ethers, S-B-S block copolymers, polyacrylate esters, vinyl esters, styrene-isoprene butadiene acrylonitrile polymers. Preferred pressure-sensitive adhesives include hot melt pressure-sensitive adhesives. The pressure-sensitive adhesive can be U.V. curable where desired. Effective hot-melt, silicone resin-based, pressure-sensitive adhesives are described in U.S. Pat. No. 5,482,988. Solvent-based pressure-sensitive adhesives, as well as water-borne adhesives, are suitable as well. Suitable solvent-based silicone resin, pressure-sensitive adhesives include those described in U.S. Pat. Nos. 4,460,371 and 5,100,976. U.S. Pat. No. 5,489,624 describes suitable hydrophilic polyethylene oxide-based pressure-sensitive adhesives. U.S. Pat. No. 4,647,504 describes suitable adhesive dispersions based on methylacrylate, styrene and methacrylate polymers. U.S. Pat. No. 5,512,612 describes suitable water dispersible, poly(alkoxyalkyl)acrylate polymers and U.S. Pat. No. 5,716,701 describes suitable acrylic copolymer emulsions.

The amount of the pressure-sensitive adhesive employed (coat weight) is preferably consistent with that employed in conventional labels. The viscosity of the adhesive also preferably conforms to that of conventional adhesives used in labels so that adhesive does not leak through the die cut or perforations.

Pressure-sensitive adhesive 50 can be applied over silicone release layer 30 to encapsulate the silicone release layer or the silicone release layer can extend beyond the pressure-sensitive adhesive, as shown in FIG. 3, with or without the label face-stock. In FIG. 3 the label face-stock extends beyond the pressure-sensitive adhesive. Preferably the pressure-sensitive adhesive is part of a label-patch wherein the pressure-sensitive adhesive is applied to the face-stock of a label and the combination is applied to the base sheet over the silicone release layer 30. Most preferably, the combination overlaps the silicone release layer to bond to the sheet 10. However, this configuration is not required.

Solid silicone release layer 30 is preferably cured on the front face 21 of base sheet 10. More preferably, the solid silicone release layer 30 is UV cured or electron beam cured on front face 21 and most preferably is cationically UV cured. Solid silicone layer 30 is preferably derived from a liquid coating formulation comprising U.V. or electron beam curable silicone resins which contains a curing agent activated by U.V or electron beam radiation. Preferred silicone resins are epoxy silicones as exemplified in U.S. Pat. Nos. 5,583,185, 5,500,300 and 5,614,640, and acrylo-functional silicones as exemplified in U.S. Pat. Nos. 4,665,147, 4,504,629, 4,563,539, 4,503,208, 4,575,546 and 5,179,134. Resins which provide dual cures, i.e., U.V. and moisture curing, include those described in U.S. Pat. Nos. 5,405,888, 5,384,340, 5,489,622 and 5,714,524.

It is desirable that the solid silicone release layer be sufficiently cured so as to limit migration of polymers therein into the pressure-sensitive adhesive, which then interfere with subsequent use of the label. It is preferable that the solid silicone release layer 30 have less than 20 wt. % extraction, and more often less than 4 wt. % extraction, based on the total weight of the layer after exposure to hexane. The solid silicone release layer 30 may be cured with the aid of conventional curing (crosslinking) agents, such as the photoinitiators described in U.S. Pat. No. 4,507,187. Examples of suitable commercially available liquid U.V. curable silicone resins are U.V. 9300 or 9305 used in a coating formulation with photoinitiator 9365 available from General Electric. Similar release materials are available from Goldschmidt.

The solid silicone release layer 30 may contain particulate fillers to enhance strength where desired. The fillers must be of a size which does not scatter U.V. light and are preferably less than ½ the size at which they scatter light, so as not to interfere with penetration of the U.V. radiation and curing of the silicone layer. Underivatized fumed silica is a preferred filler. Fumed silica particles are preferably less then 200 nanometers and more preferably have a size less than 20 nanometers. Suitable examples of particulate silica include Cab-o-sperse® 2, Cab-o-sperse® A205, Cab-o-sperse® A105, Cab-o-sperse® P-1175, Cab-o-sperse® S-109, Cab-o-sperse® P-1010, available from Cabot Corporation, Cab-o-sil Division, Tuscola, Ill., and Aerosil 130, Aerosil 200 and Aerosil MOX80, available from Degussa Corporation, Ridgefield Park, N.J. The amount of filler, when used, preferably falls within the range of 0.5–20 wt. %.

Curing the solid silicone resin release layer on top of the base sheet provides great flexibility in patterning the silicone resin release layer to provide various configurations for labels.

Suitable thicknesses for the solid silicone release layer vary widely and preferably are less than 1 mm and most preferably are in the range from 0.3 to 10 microns. The solid silicone release layer provides a release face (surface) for the pressure-sensitive adhesive. The silicone resin may optionally be further modified by the incorporation of fluorine, which aids in the release of adhesive.

To enhance the performance of a silicone layer, multiple silicone layers may be applied. In fact, distinct silicone layers can be applied such that high release may be provided by the outer layer, while the rough surfaces of the base sheet are filled with an inner layer. The multiple silicone layers can be cured either simultaneously or sequentially. Two solid silicone layers may have different properties but comprise the same silicone resins containing distinct levels of curing agent.

The solid silicone release layer 30 is overlaid by the label-patch that comprises pressure-sensitive adhesive 50 and face-stock 45. The label-patch preferably has a larger surface area than the solid silicone release layer but this is not required. The label-patch is also preferably positioned over the solid silicone release layer 30 so that the pressure-sensitive adhesive contacts the solid silicone release layer and a portion of the pressure-sensitive adhesive 50 contacts and bonds to the front surface 21 of the base sheet 10 by the overlapping portions along edges 51 and 52. Preferably, the overlap is as least ⅛ inch beyond the solid silicone release layer 30.

The label 20 is defined on the face-stock 45 of the label-patch 40 by either a die cut, perforation or micro-perforation within the face-stock of the label-patch to enable easy removal. Perforations can be accomplished either before or after application of the label-patch to the base sheet. Where the labels are die cut before application of the face-stock to the base sheet, means for securing the labels must be provided. The printable sheet may include more than one label defined by a die cut, perforation or micro-perforation. Up to 90% of the printable sheet may comprise labels. Preferably, less than 75% of the printable sheet comprises labels and most preferably less than 50% of the printable sheet comprises labels.

The label-patch 40 and solid silicone release layer 30 do not present a significant increase in the thickness of the printable sheet and the labels are well secured to the base sheet, thus reducing printing complications. The labels show good stability so as not to release during printing and provide good adhesion when applied to another substrate for their ultimate use, such as a pill bottle.

The method of the present invention provides printable sheets with removable labels integrated therein. The method comprises providing a base sheet having a front face suitable for printing and for a solid silicone resin release layer and pressure-sensitive adhesive to adhere thereto. Conventional paper substrates, synthetic polymer substrates and other cellulosic materials discussed above with respect to the printable sheets of the present invention, are suitable. A portion of the front surface of the base sheet is coated with a solid silicone resin release layer. This can be accomplished by conventional means, including brushing, spreading, spraying, rolling or extruding a coating composition with conventional equipment such as a kiss roll, air knife or doctor blade and curing the layer. For greater control over the location of the silicone release layer, flexographic printing methods and equipment and ink jet methods and equipment can be used.

Suitable solid silicone release layers include those described above with respect to the printable sheets of the present invention. Preferably, a silicone resin coating formulation comprising a curable silicone resin and UV curing agent is applied to the front face of the base sheet. The curable silicone resin is crosslinked by exposure to U.V. or electron beam radiation with the aid of these curing agents. It is necessary that the curable silicone resins be cured to a level so that less than 20 wt. % is extracted from the solid silicone layer in the presence of hexane. More often than not, less than 4 wt. % is extracted from the silicone resin in the presence of hexane. The silicone resin can be cured in a conventional light array, light box or electron beam apparatus.

Following curing of the solid silicone resin release layer, a label-patch is applied over this release layer which comprises a face-stock and pressure-sensitive adhesive layer. The label-patch preferably overlaps the silicone release layer so that the adhesive binds to the base sheet. The face-stock preferably is cut at the location where the pressure-sensitive adhesive and solid silicone resin release layer overlap to define the removable label. The face-stock may be cut in advance or it may be cut once applied to the base sheet to define at least one removable label by either perforations or a die cut that completely surrounds the label. Cutting perforations in the face-stock can be easily performed before or after application of the label-patch to the base sheet but since the die cuts completely surround the label it is preferable to perform this operation after the label-patch is applied to the base sheet.

The entire disclosure of all applications, patents and publications, cited above and below, is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A printable form having a base sheet and at least one integral, removable label with a face-stock of a printable material distinct from the base sheet; said printable form comprising:

a) a base sheet having a front face and a rear face, wherein said front face is capable of receiving print thereon, is capable of having a solid silicone release layer bound thereto and is capable of having a pressure-sensitive adhesive bound thereto;

b) a solid silicone release layer coated on a portion of the front face of said base sheet, wherein the solid silicone release layer provides a release face for a pressure-sensitive adhesive; and c) a label-patch which comprises a sheet of face-stock of a printable material distinct from the base sheet coated with a layer of pressure-sensitive adhesive, wherein the label-patch is positioned over the solid silicone release layer such that the pressure-sensitive adhesive contacts the solid silicone release layer so as to bond the face-stock to the base sheet; and d) at least one perforation, micro-perforation or die cut formed in a portion of the face-stock of said label-patch, wherein the perforation, micro-perforation or die cut in the face-stock defines one or more integral removable labels, wherein the integral removable labels comprise less than 50% of the printable surface of the printable form.

2. A printable form as in claim 1 wherein a) the label-patch has a larger surface area than the solid silicone release layer and is positioned over the solid silicone release layer such that the pressure-sensitive adhesive contacts the solid silicone release layer and a portion of the front face of the base sheet so as to bond the face-stock to the front face of the base sheet, and b) the perforation, micro-perforation or die cut is formed in a portion of the face-stock of said label-patch which is coated with a pressure-sensitive adhesive and positioned over the solid silicone layer.

3. A printable form as in claim 1 wherein the face-stock of said label-patch is comprised of a sheet of synthetic polymer and said printable form consists of 2 plies, the base sheet and said sheet of synthetic polymer.

4. A printable form as in claim 1, which comprises two integral, removable labels, with face-stocks of distinct printable materials.

5. A printable form as in claim 1 wherein the solid silicone layer has a thickness of less than 1 mm.

6. A printable form as in claim 1 wherein the silicone polymers in said solid silicone release layer are cured to a level which provides a degree of extraction of silicone polymer from the solid silicone release layer with hexane of less than 20%.

7. A printable form as in claim 1 wherein the solid silicone release layer comprises U.V. cured or electron beam cured silicone polymers comprising epoxy silicones or acrylosilicones.

8. A printable form as in claim 1 wherein the entire rear face of said base sheet is capable of receiving print thereon.

9. A printable form having a base sheet and at least one integral, removable label with a face-stock of a printable material distinct from the base sheet; said printable form comprising:

a) a base sheet having a front face and a rear face, wherein said front face is capable of receiving print thereon, is capable of having a solid silicone release layer bound thereto and is capable of having a pressure-sensitive adhesive bound thereto;

b) a solid silicone release layer coated on a portion of the front face of said base sheet wherein the solid silicone release layer provides a release face for a pressure-sensitive adhesive; and;

c) a label-patch which comprises a sheet of face-stock of a printable material distinct from the base sheet coated with a layer of pressure-sensitive adhesive, wherein the label-patch has a larger surface area than the solid silicone release layer and is positioned over the solid silicone release layer such that the pressure-sensitive adhesive contacts the solid silicone release layer and a portion of the front face of the base sheet so as to bond the face-stock to the front face of the base sheet; and d) at least one perforation, micro-perforation or die cut formed in a portion of the face-stock of said label-patch coated with a pressure-sensitive adhesive and positioned over the solid silicone layer, wherein the perforation, micro-perforation or die cut in the face-stock defines at least one removable label;

wherein the face-stock of said label-patch is comprised of a sheet of synthetic polymer and said printable form consists of 2 plies, the base sheet and said sheet of synthetic polymer.

10. A printable form as in claim 9, which comprises at least two integral, removable labels, wherein at least one label has a face-stock which is comprised of a sheet of synthetic polymer and at least one label has a face-stock which is comprised of a material distinct from said synthetic polymer.

11. A printable form as in claim 9, wherein the solid silicone layer has a thickness of less than 1 mm.

12. A printable form as in claim 9, wherein the silicone polymers in said silicone release layer are cured to a level which provides a degree of extraction of silicone polymer from the solid silicone release layer with hexane of less than 20%.

13. A printable form as in claim 9, wherein the solid silicone release layer comprises UV-cured or electron beam cured silicone polymers comprising epoxy silicones or acrylosilicones.

14. A printable form as in claim 9, wherein the integral removable labels comprise less than 50% of the printable surface thereof.

15. A printable form as in claim 9, wherein the entire rear face of base sheet is capable of receiving print thereon.

16. A printable form as in claim 9, wherein the base sheet is comprised of paper.

17. A printable form having a base sheet and at least one integral, removable label with a face-stock of a printable material distinct from the base sheet; said printable form comprising:

a) a base sheet having a front face and a rear face, wherein said front face is printable, is capable of having a solid silicone release layer bound thereto and is capable of having a pressure-sensitive adhesive bound thereto;

b) a solid silicone release layer coated on a portion of the front face of said base sheet, wherein the solid silicone release layer provides a release face for a pressure-sensitive adhesive; and c) a label-patch which comprises a sheet of face-stock of a printable material distinct from the base sheet coated with a layer of pressure-sensitive adhesive, wherein the label-patch is positioned over the solid silicone release layer such that the pressure-sensitive adhesive contacts the solid silicone release layer so as to bond the face-stock to the base sheet; and d) at least one perforation, micro-perforation or die cut formed in a portion of the face-stock of said label-patch, wherein the perforation, micro-perforation or die cut in the face-stock defines one or more integral removable labels, wherein the integral removable labels comprise less than 50% of the printable surface of the printable form.

* * * * *